(12) United States Patent
Rao et al.

(10) Patent No.: US 6,428,755 B1
(45) Date of Patent: *Aug. 6, 2002

(54) CATALYST ASSEMBLY FOR AN EXHAUST GAS SYSTEM

(75) Inventors: Durga Rao, Bloomfield Township; Harry Arthur Cikanek, Northville; Rodney John Tabaczynski, Saline, all of MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,442

(22) Filed: Oct. 4, 1999

(51) Int. Cl.[7] .......................... B01D 53/88; B01D 53/94; F01N 3/28
(52) U.S. Cl. ...................... 422/180; 422/171; 422/177; 422/222
(58) Field of Search ................................ 422/177, 180, 422/171, 222; 60/299, 300; 50/523, DIG. 30

(56) References Cited

U.S. PATENT DOCUMENTS

| 2,396,190 | A | | 3/1946 | Morgan et al. | |
|---|---|---|---|---|---|
| 3,770,389 | A | * | 11/1973 | Kitzner et al. | 422/174 |
| 3,925,252 | A | | 12/1975 | Yabuta et al. | |
| 3,960,528 | A | | 6/1976 | Jacobs et al. | |
| 4,106,913 | A | | 8/1978 | Bunda et al. | |
| 4,504,294 | A | | 3/1985 | Brighton | |
| 4,509,966 | A | | 4/1985 | Dimick et al. | |
| 4,669,261 | A | | 6/1987 | Wörner et al. | |
| 4,830,833 | A | | 5/1989 | Shaff | |
| 5,089,237 | A | * | 2/1992 | Schuster et al. | 422/180 |
| 5,316,738 | A | * | 5/1994 | Kojima et al. | 422/180 |
| 5,367,131 | A | | 11/1994 | Bemel | |
| 5,492,679 | A | * | 2/1996 | Ament et al. | 422/180 |
| 5,758,496 | A | | 6/1998 | Rao et al. | |

* cited by examiner

*Primary Examiner*—Hien Tran
(74) *Attorney, Agent, or Firm*—Jerome R. Drouillard

(57) ABSTRACT

A catalyst assembly 16 for an exhaust gas system 14 for an automotive vehicle includes a housing 28 and a porous support structure 32 having a plurality of channels 34, 36. A plurality of catalyst pellets 50 are disposed within at least some of the channels. A retainer 54 is positioned adjacent to the support structure 32 for retaining the pellets 50 within the channels 34, 36.

21 Claims, 7 Drawing Sheets

CATALYST ASSEMBLY FOR AN EXHAUST GAS SYSTEM

TECHNICAL FIELD

The present invention relates generally to a catalyst assembly for an automotive vehicle, and more particularly, to the catalyst structure assembly.

BACKGROUND

Current production automotive vehicles have internal combustion engines that have catalytic converters to reduce emissions of regulated gasses. The regulated gasses include hydrocarbons, carbon monoxide, and oxides of nitrogen. The catalytic converter contains various catalysts that react with the exhaust gasses to convert them into other gasses.

In addition to the catalytic converter, a muffler and resonator are typically located in the exhaust gas path. The muffler and resonator attenuate the sound from the internal combustion engine. The muffler and resonator are coupled to the tail pipe of the vehicle which typically extends out from the rear portion of the vehicle.

It is a goal of automotive engineers to reduce the number of parts and design complexity of the automotive vehicle. To accommodate the muffler, catalytic converter and resonator, the floor stamping of the vehicle is modified. The modification of the floor stamping increases the cost of the vehicle and adds to the design complexity.

It would therefore be desirable to reduce the cost of the automotive vehicle by eliminating the muffler and resonator to reduce the complexity of the vehicle.

SUMMARY OF THE INVENTION

In one aspect of the invention, a catalyst assembly for an exhaust system comprises a housing and a porous support structure having a plurality of channels. A plurality of catalyst pellets are disposed within at least some of the channels. A retainer is positioned adjacent to the support structure for retaining the pellets within the channels.

In a further aspect of the invention, some of the plurality of parallel channels are inlet channels and the other channels are outlet channels. The inlet channels and the outlet channels are coupled between the porous support structure. The plurality of catalyst pellets may be disposed in either the inlet channels, the outlet channels, or both. The position of the pellets depends upon many factors including the type of engine and the amount of desired reduction of regulated gasses.

One advantage of the invention is that the catalyst assembly may be located relatively close to the engine manifold within the engine compartment. Another advantage of the invention is that the catalyst assembly may be designed to reduce the noise emissions from the internal combustion engine and thus reduce the need for a resonator and a muffler. Yet a further advantage of the invention is that by eliminating the muffler and resonator, the floor stamping for the vehicle may be reduced in complexity.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
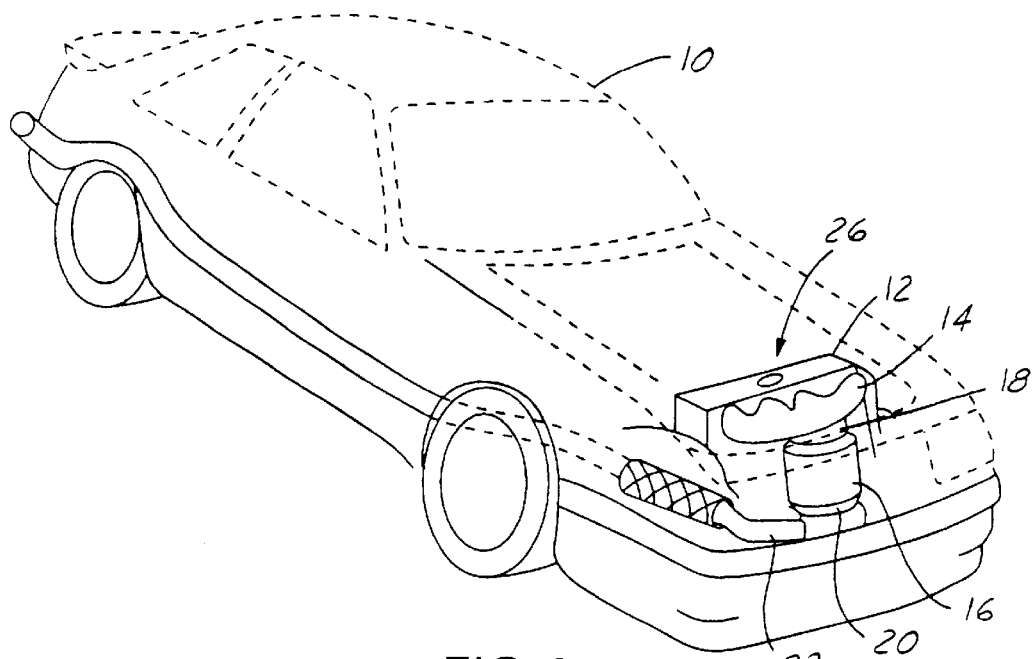
FIG. 1 is a perspective view of an automotive vehicle having a catalyst assembly according to the present invention.

Referring now to the drawings, like reference numerals are used to identify identical components in the various views. While the present invention is described with respect to particular shapes and sizes of various aspects of the catalyst assembly, those skilled in the art would recognize that various shapes and sizes of the various aspects of the catalyst assembly may be used.

Referring now to FIG. 1, automotive vehicle 10 has an internal combustion engine 12 that generates exhaust gasses. The exhaust gasses exit the engine 12 through an exhaust manifold 14. Exhaust manifold 14 is coupled to a catalyst assembly 16 through an inlet 18. Catalyst assembly 16 has an outlet 20 that is coupled to an exhaust system 22. The exhaust system 22 has a tail pipe 24 that emits gasses therefrom. Catalyst assembly 16 may be directly coupled to manifold 14 or coupled through a connecting pipe (not shown).

As illustrated, catalyst assembly 16 is located within engine compartment 26 of automotive vehicle 10. Catalyst assembly 16 may, however, be located at various locations along exhaust system 22. However, by placing the catalyst assembly 16 within engine compartment 26, the floor pan (not shown) of vehicle 10 can be more simply designed since it does not have to accommodate the catalyst assembly 16.

Figure 2:
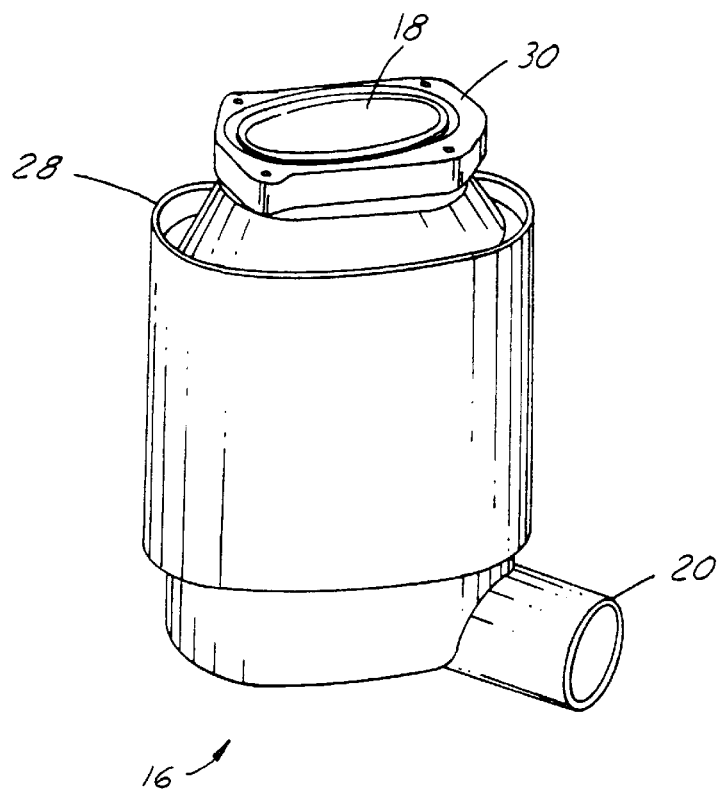
FIG. 2 is a perspective view of a catalyst assembly according to the present invention.

Referring now to FIG. 2, one embodiment of an oval catalyst assembly 16 is illustrated in perspective. Catalyst assembly 16 includes a housing 28 that surrounds the internal support structure for the catalyst material. Housing 28 is preferably formed of a metallic material to permit heat dissipation. Inlet 18 may have a flange 30 that is used for coupling the inlet 18 directly to the exhaust manifold 14 of the vehicle. Housing 28 may also have outlet 20 integrally formed therewith. Outlet 20 is used to interface with exhaust system 22.

Figure 3:
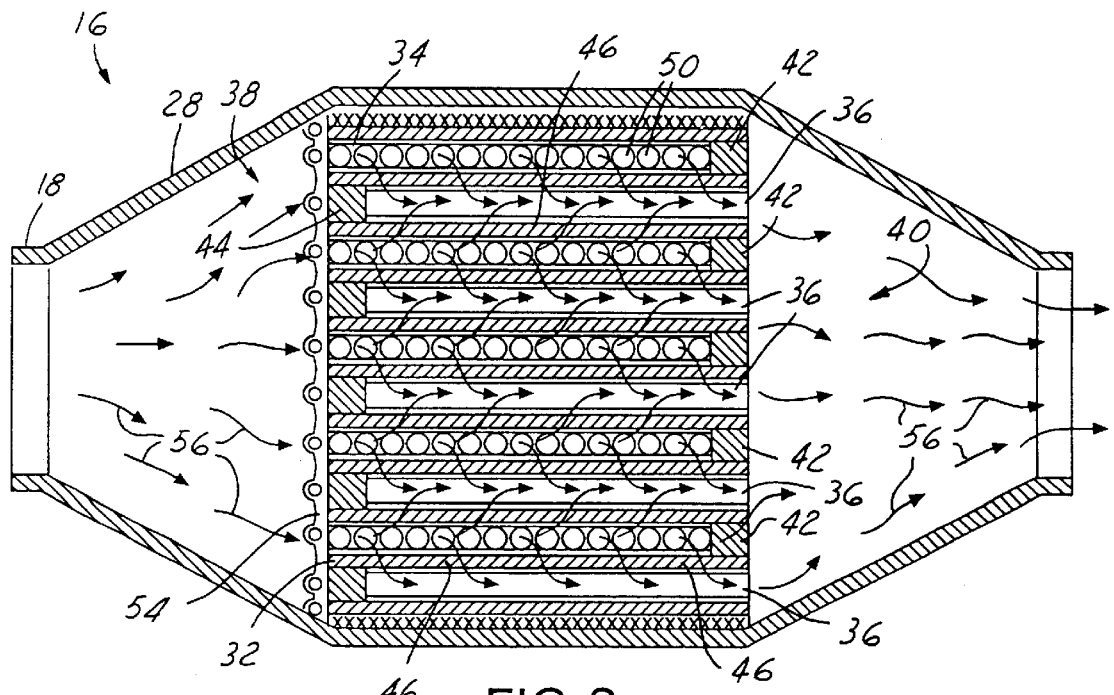
FIG. 3 is a cross-sectional view of a first embodiment of a catalyst assembly.
Figure 4:
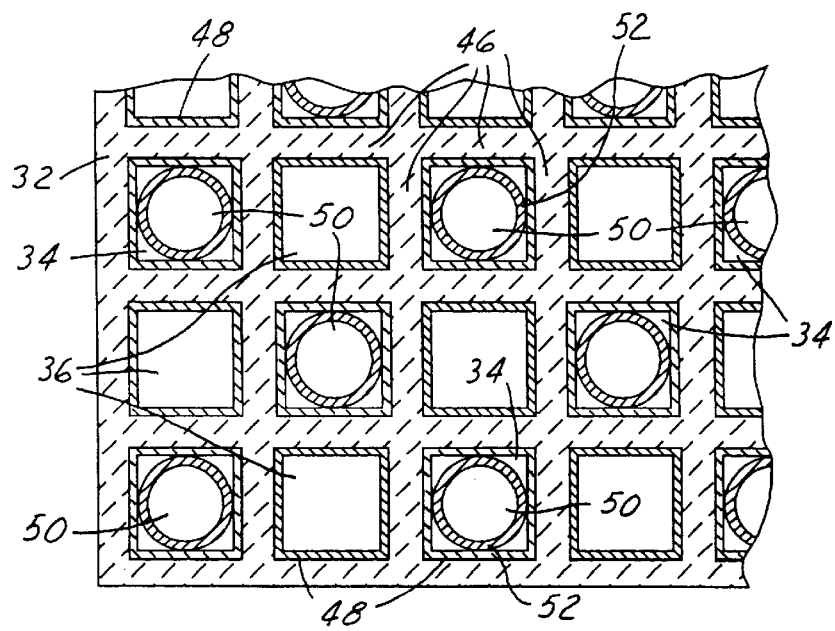
FIG. 4 is a partial end view of the catalyst assembly of FIG. 3.

Referring now to FIGS. 3 and 4, a cross-sectional view of a first embodiment of catalyst assembly 16 within housing 28 is illustrated. Housing 28 surrounds a catalyst support structure 32. Catalyst support structure 32 is composed of a permeable ceramic material such as Cordite®. Catalyst support structure 32 preferably has a generally rectilinear honeycomb structure consisting of a plurality of parallel channels. The parallel channels are divided into alternating inlet channels 34 and exit channels 36. Inlet channels 34 are opened at an inlet end 38 of support structure 32 and plugged at the exit end 40 with a plug 42. Conversely, exit channels 36 have a plug 44 at the inlet end 38 and are open at the exit end 40. Inlet channels 34 and exit channels 36 are separated by thin, porous longitudinal sidewalls 46 which permit the exhaust gasses to pass from inlet channels 34 to exit channels 36 along their length. In the preferred embodiment, the inlet channel 34 and exit channels 36 have a rectangular cross-sectional shape. Channels 34, 36 are approximately 8 to 12 inches long and 0.083 inches wide. However, the length of the inlet and exit channels may vary from 2 to 24 inches and their widths may vary from 0.05 to 0.15 inches. The honeycomb monolithic support structure 32 provides a large catalyzation area per unit volume. Also, the channels 34, 36 reduce the noise between the inlet end 38 and the exit end 40. The support structure 32 also provides noise attenuation due to the path the noise takes through the inlet and exit channels.

The porous walls 46 separating the inlet channels 34 from the exit channels 36 are approximately 0.107 inches thick. The pores (shown in FIG. 11) in sidewalls 46 are small enough to allow exhaust gasses to be catalyzed and pass therethrough.

An oxidation catalyst 48 is deposited on the internal surfaces of inlet channels 34 and exit channels 36. Oxidation catalyst 48 may be platinum, paladium or a platinum-paladium alloy such as that used in current automotive catalytic converters. As is known in the art, platinum, paladium and alloys thereof are catalysts which promote the oxidation of the hydrocarbons and carbon monoxide byproducts of the exhaust gasses.

Inlet 34 has catalyzed pellets 50 disposed therein. Catalyzed pellets 50 may be formed from a catalyst material or may have a catalyst coating 52. In this embodiment, each inlet channel 34 is filled with catalyzed pellets 50. As illustrated, catalyzed pellets 50 are spherical. However, catalyzed pellets 50 may be one of a number of shapes such as oval, oblong, cylindrical or an irregular shape.

A retainer 54 is used to hold the catalyzed pellets 50 into inlet channels 34. Retainer 54 is used to tightly hold catalyzed pellets 50 in place so that they do not rattle. Retainer 54 must be capable of withstanding the temperatures typically found in exhaust gasses. Also, retainer 54 must be durable to last through the life of the vehicle. Suitable materials for retainer 54 include stainless steel wire mesh and temperature woven ceramic fabric such as $ZrAlSiO_2$.

In operation, exhaust gasses as represented by arrows 56 enter housing 28 through inlet 18. The exhaust gasses 56 enter inlet channels 34 and pass by catalyzed pellets 50. The oxidation catalyst 48 and the catalyzed pellets 50 convert noxious gasses in the exhaust gas 50 into m ore desirable gasses. Gasses flow from inlet channels 34 into sidewalls 46 and into exit channels 36. Further, catalyzation takes place with the oxidation catalyst 48 within exit channels 36.

Figure 5:
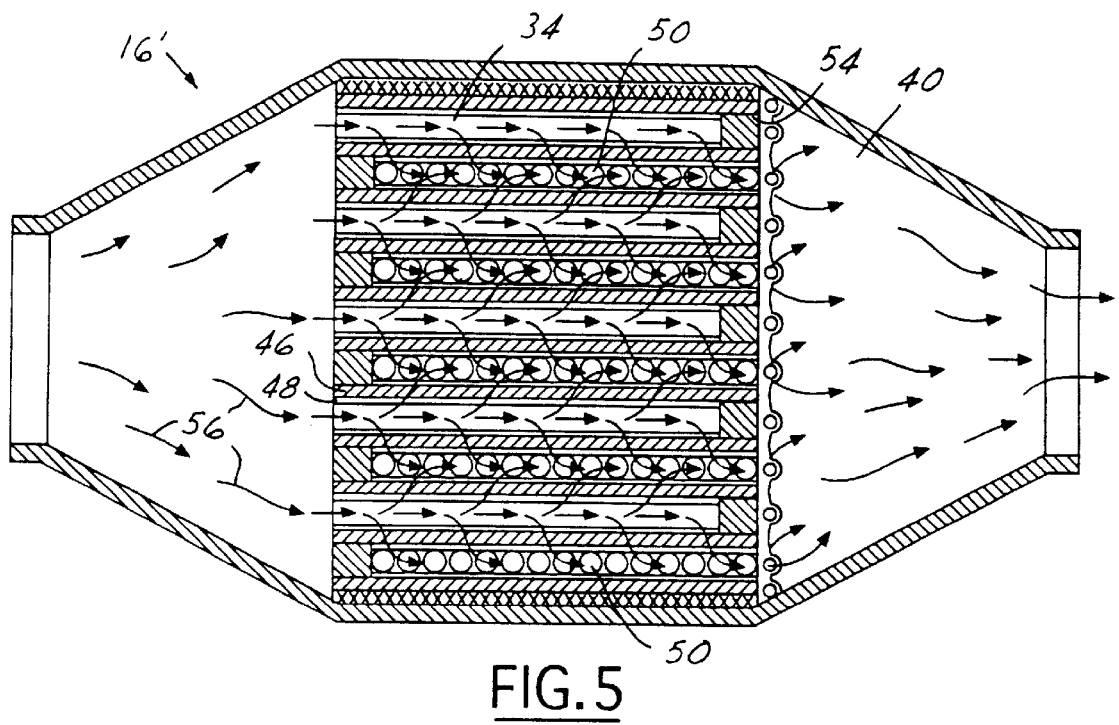
FIG. 5 is a cross-sectional view of a second embodiment of a catalyst assembly.
Figure 6:
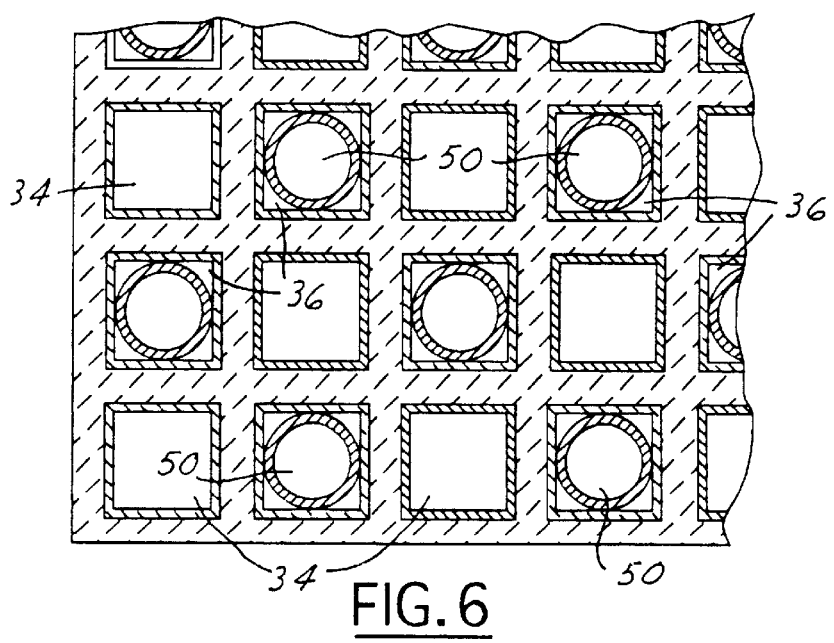
FIG. 6 is a partial end view of the catalyst assembly of FIG. 5.

Referring now to FIGS. 5 and 6, in this second embodiment of a catalyst assembly 16', catalyzed pellets 50 are placed within exit channels in contrast to FIGS. 3 and 4 above. This embodiment protects catalyzed pellets 50 from impurities in the exhaust stream. For example, oil additives such as zinc thiophosphate may damage particular catalysts. In this embodiment, the exhaust gasses 56 first contact oxidation catalysts 48 in inlet channels 34. The exhaust gasses partially purified by oxidation catalyst 48 travel through sidewalls 46 and into exit channels 36 through another oxidation catalyst 48. In this embodiment, retainer 54 is positioned at exit end 40 to retain the catalyzed pellets 50 within exit channels 36.

Figure 7:
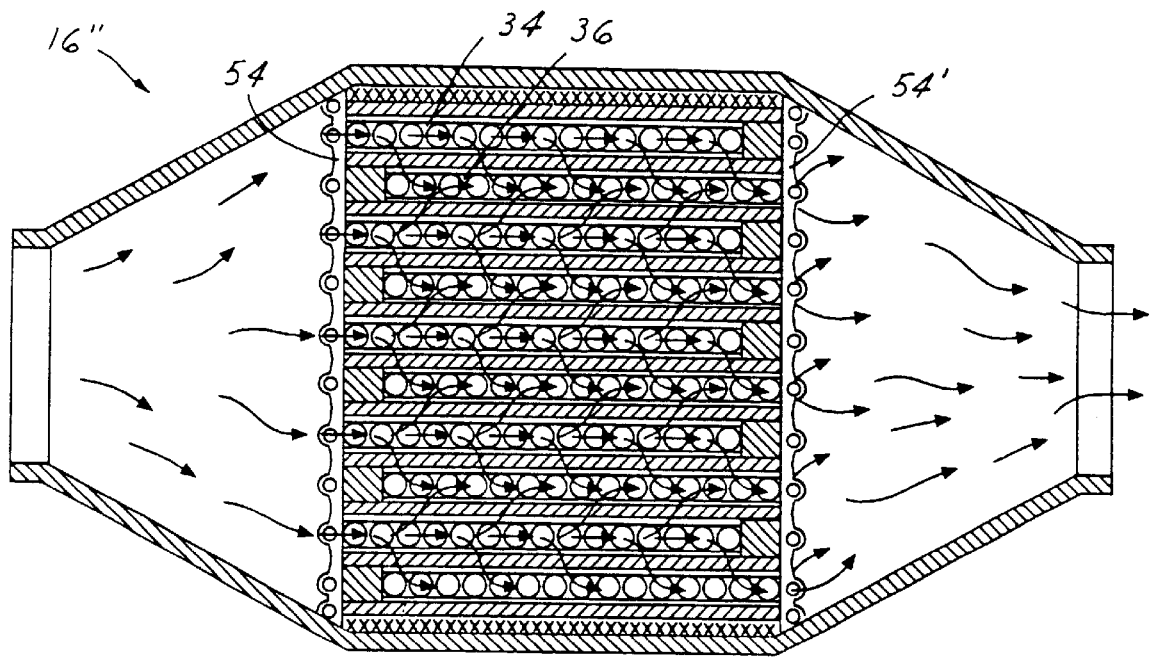
FIG. 7 is a third embodiment of a catalyst assembly.
Figure 8:
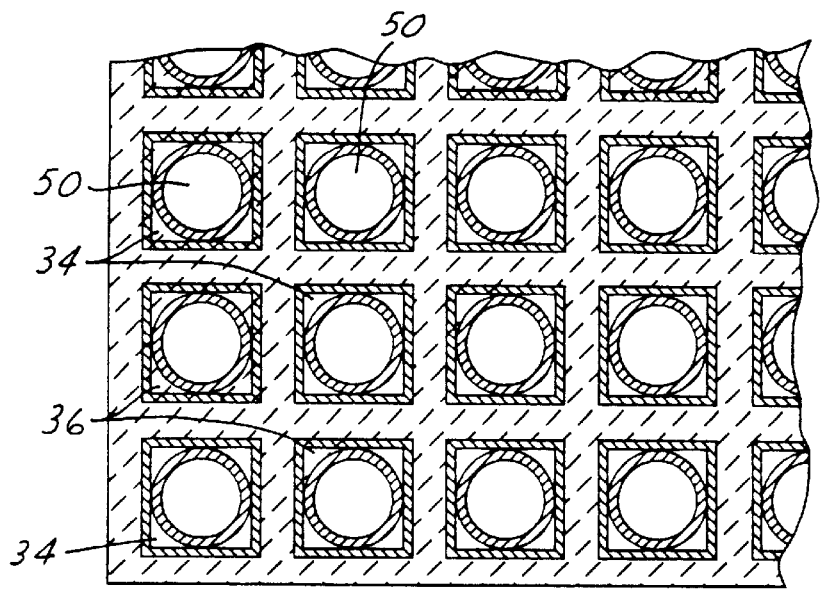
FIG. 8 is a partial end view of the catalyst assembly of FIG. 7.

Referring now to FIGS. 7 and 8, in this third embodiment of a catalyst assembly 16", both inlet channels 34 and exit channels 36 have catalyzed pellets 50 disposed therein. To retain pellets 50 within exit channels 36, a second retainer 54' is used. This embodiment provides the greatest surface area for contact with the exhaust gas with the catalyst. This embodiment also provides capability of providing a unique oxide of nitrogen absorbing catalyst in the inlet channel 34 with a reducing atmosphere. Exit channels 36 and catalyzed pellets 50 provide a further oxidizing atmosphere for the majority of the engine regime operation. This embodiment also provides an opportunity for emission reduction during cold starts.

In the above embodiments, acoustic attenuation of the catalyst support structure 32 is enhanced by adding catalyzed pellets 50 into inlet channels 34, exit channels 36 or the combination of both.

Figure 9:
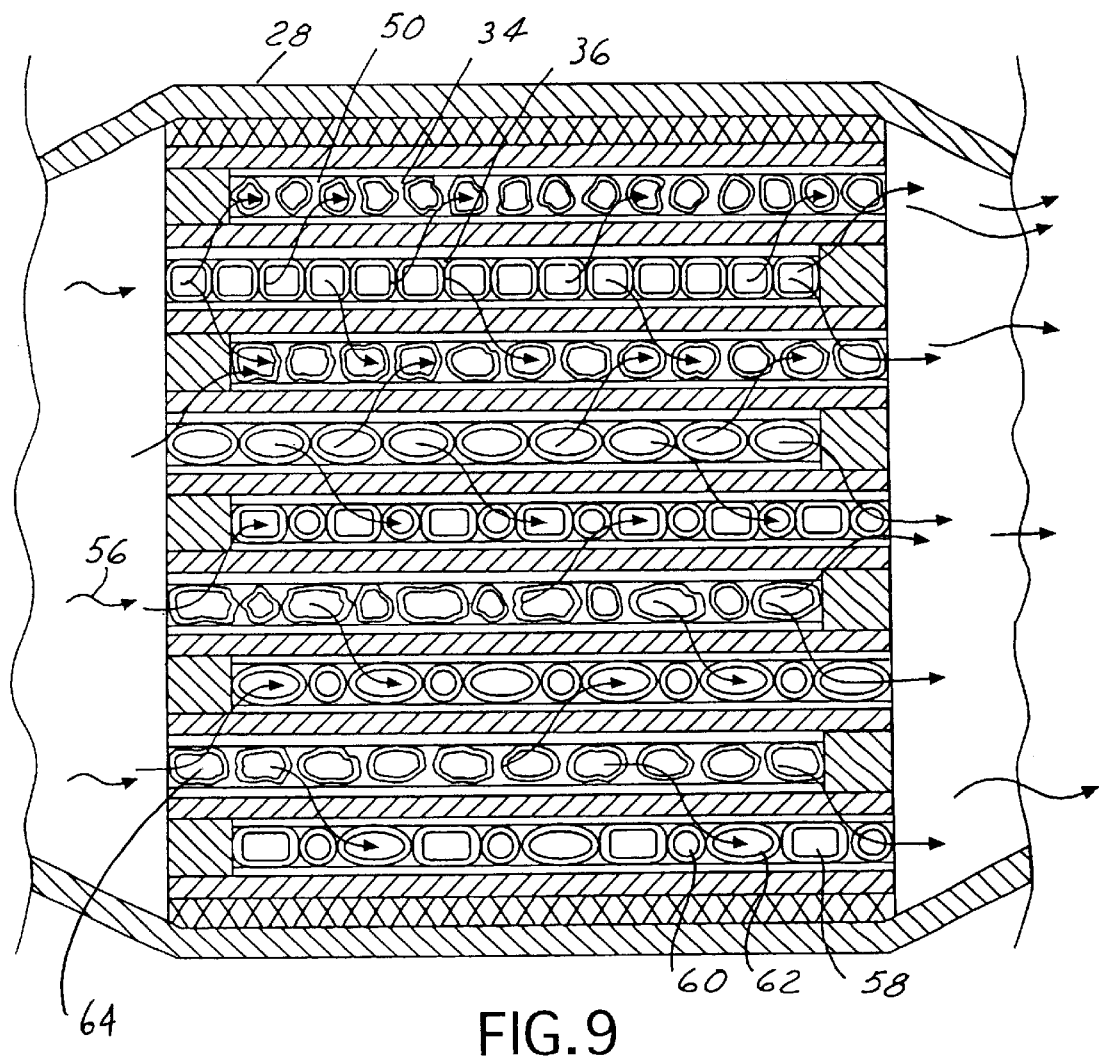
FIG. 9 is a cross-sectional view of a catalyst assembly having irregularly shaped catalyst pellets.

Referring now to FIG. 9, an embodiment similar to that shown in FIGS. 7 and 8 is illustrated. That is, catalyzed pellets 50 are disposed within both the inlet channels 34 and exit channels 36. However, in this embodiment the catalyzed pellets comprise cylindrical pellets 58, spherical pellets 60, oblong pellets 62, and irregular pellets 64. Pellets 58 through 64 can be mixed and matched in any support structure 32 to optimize gas flow, acoustics, and/or emission control. Pellets 58 through 64 may be coated or uncoated, etched or unetched, and may be mixed in the various inlet or exit channels the materials that the pellets are made from may also vary.

Figure 10:
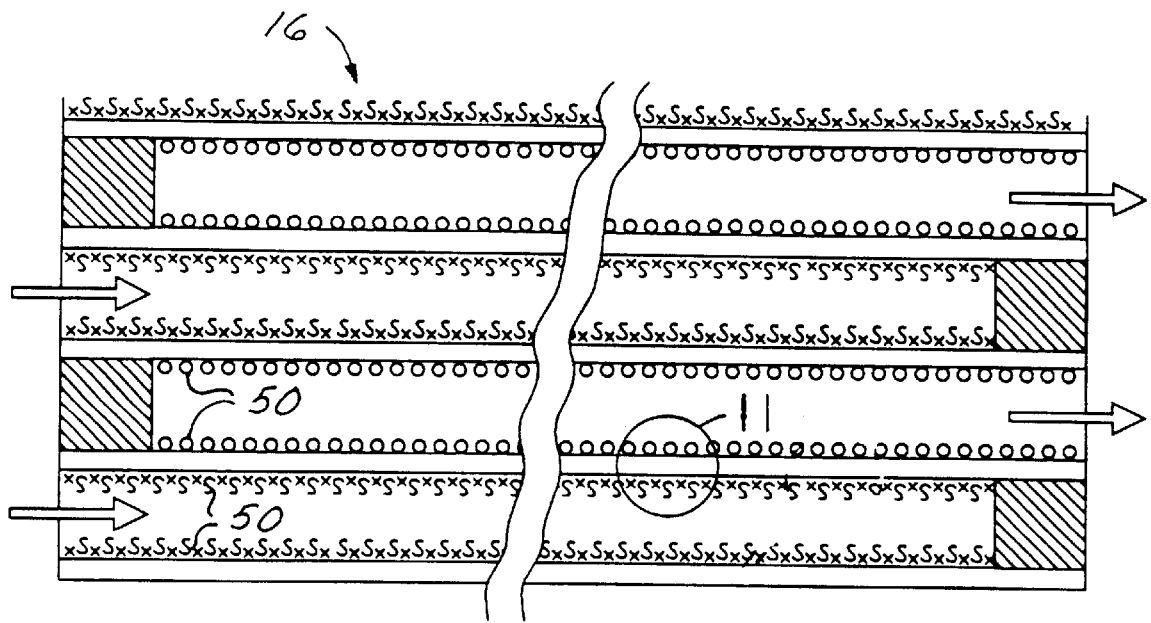
FIG. 10 is a cross-sectional view of a fourth embodiment of the present invention.

Referring now to FIG. 10, a portion of catalyst assembly 16 is illustrated. In this embodiment, catalyzed pellets 50 are adjacent to the sides of inlet channels 34 and exit channels 36.

Figure 11:
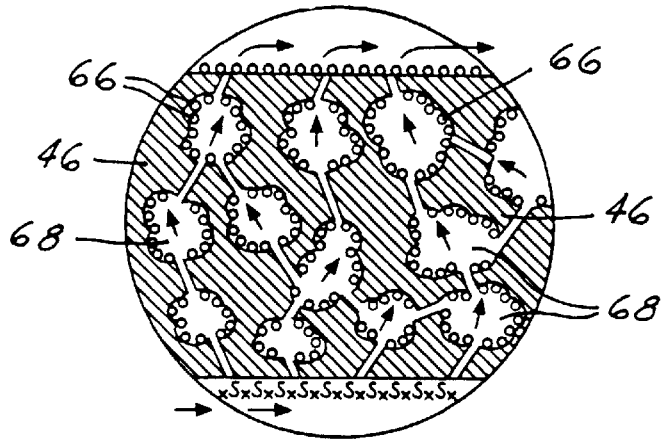
FIG. 11 is a partial cross-sectional view in an enlarged scale of a portion of FIG. 10.

Referring now to FIG. 11, the catalyst material 66 is also preferably present within pores 68 of sidewalls 46. By providing catalyst material 66 within pores 68, the converted exhaust gas is increased by providing an increase in surface area providing a more intimate contact of the exhaust gasses with the oxidation layer as exhaust gasses pass from inlet channel 34 to exit channel 36.

Figure 12:
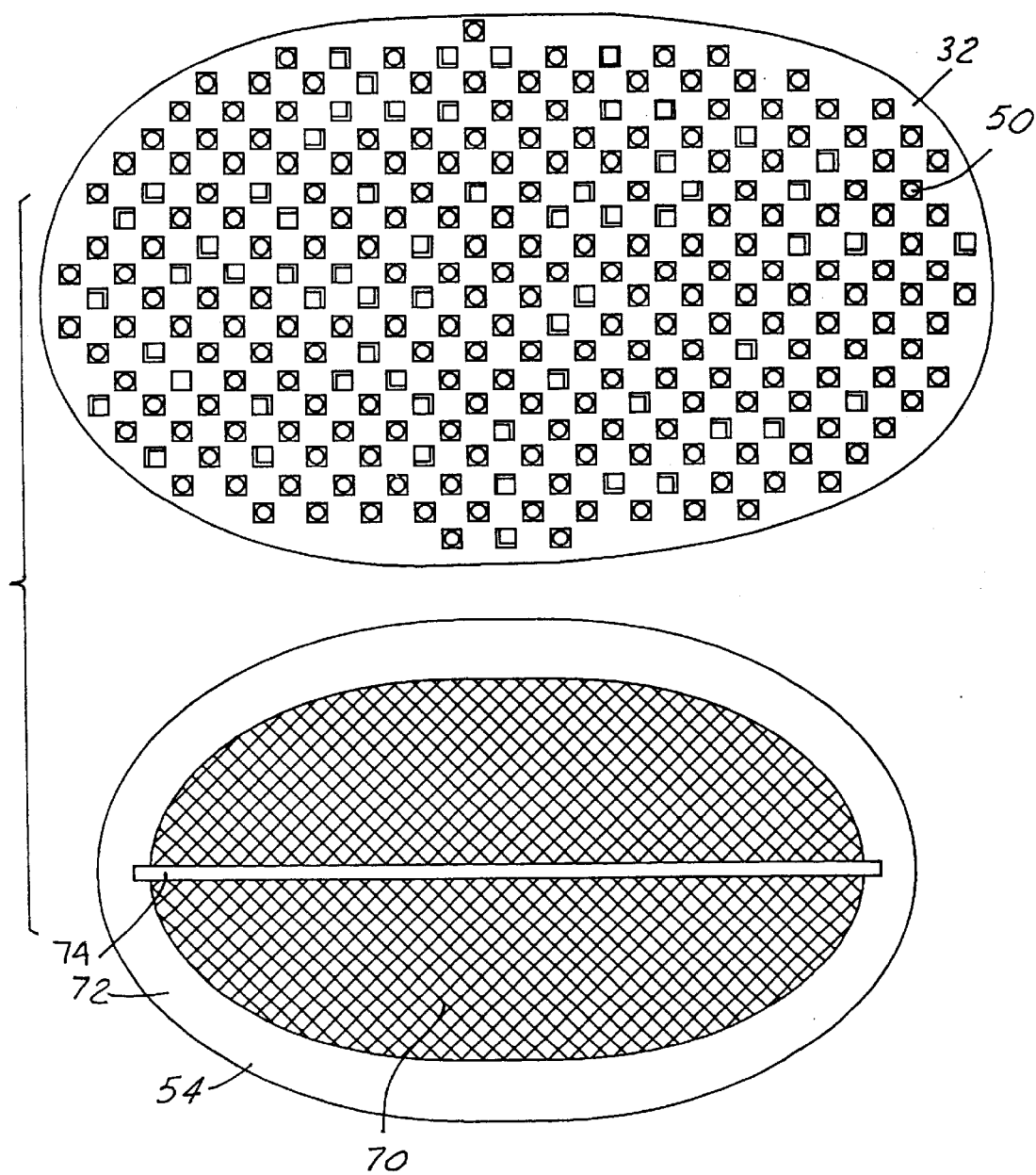
FIG. 12 is an exploded view of a catalyst support structure and a retainer.

Referring now to FIG. 12, retainer 54 is shown with respect to catalyst support structure 32. Catalyst support structure 32 in this embodiment is oval in shape. Retainer 54 has a correspondingly oval shape. Retainer 54 is preferably comprised of a fine mesh 70 that allows catalyzed pellets 50 to be retained tightly within their respective inlet channels 34 or exit channels 36. A frame 72 extends around mesh 70 to allow mesh 70 to be fastened to catalyst support structure 32. A retainer bar 74 is positioned across mesh 70 to prevent movement of mesh 70 during the operation of the vehicle. Retainer bar 74 assists mesh 70 in firmly retaining catalyzed pellets 50 within the inlet channels 34 or exit channels 36. In an embodiment providing catalyzed pellets 50 in both inlet channels 34 and exit channels 36, the second retainer 54' may be similarly configured.

While particular embodiments of the invention have been shown and described, numerous variations and alternate embodiments will occur to those skilled in the art. Accordingly, it is intended that the invention be limited only in terms of the appended claims.

What is claimed is:

1. A catalyst assembly for an exhaust system comprising:

a housing;

a porous support structure positioned with said housing, said support structure including a plurality of parallel channels;

a plurality of catalyst pellets disposed within at least some of said plurality of channels, each of said catalyst pellets sized to extend across said plurality of channels; and a retainer positioned adjacent to said support structure for retaining said pellets within said channels.

2. A catalyst assembly as recited in claim 1 wherein said channels are comprised of inlet channels having an open inlet end and a closed exit end.

3. A catalyst assembly as recited in claim 2 wherein said catalyst pellets are disposed within said inlet channels.

4. A catalyst assembly as recited in claim 2 wherein said inlet channels comprise a catalyst coating.

5. A catalyst assembly as recited in claim 1 wherein said channels comprises exit channels having a closed inlet end and an open exit end.

6. A catalyst assembly as recited in claim 5 wherein said catalyst pellets are disposed within said exit channels.

7. A catalyst assembly as recited in claim 5 wherein said exit channels comprises a catalyst coating.

8. A catalyst assembly as recited in claim 1 wherein said catalyst pellets have a shape selected from spherical, round and irregular.

9. A catalyst assembly as recited in claim 1 further comprising a second retainer positioned adjacent to the support structure.

10. A catalyst assembly as recited in claim 1 wherein said support structure is monolithic.

11. An automotive vehicle comprising:

an internal combustion engine having an exhaust manifold emitting exhaust gas;

a catalyst assembly coupled to said exhaust manifold receiving said exhaust gas;

said catalyst assembly comprising, a housing;

a porous support structure positioned within said housing, said support structure including a plurality of parallel channels;

a plurality of catalyst pellets disposed within at least some of said plurality of channels, each of said catalyst pellets sized to extend across said plurality of channels; and a retainer positioned adjacent to said support structure for retaining said pellets within said channels.

12. An automotive vehicle as recited in claim 11 wherein said channels are comprised of inlet channels having an open inlet end and a closed exit end and exit channels having a closed inlet end and an open exit end.

13. An automotive vehicle as recited in claim 11 wherein said catalyst pellets are disposed within said inlet channels.

14. An automotive vehicle as recited in claim 11 wherein said inlet channels comprise a catalyst coating.

15. An automotive vehicle as recited in claim 11 wherein said catalyst pellets are disposed within said exit channels.

16. An automotive vehicle as recited in claim 11 wherein said exit channels comprises a catalyst coating.

17. An automotive vehicle as recited in claim 12 wherein said inlet channels and said exit channels are alternatively positioned in said support structure.

18. A catalyst assembly for an exhaust system comprising:

a housing;

a porous support structure positioned with said housing, said support structure including a plurality of parallel channels, said parallel channels including inlet channels having an open inlet end and a closed exit end and exit channels having an open exit end and a closed inlet end;

said exit channels having a catalyst coating disposed thereon;

a plurality of catalyst pellets disposed within said exit channels adjacent to said coating, each of said catalyst pellets sized to extend across said plurality of channels; and a retainer positioned adjacent to said support structure for retaining said pellets within said exit channels.

19. A catalyst assembly as recited in claim 18 wherein said catalyst pellets are disposed within said inlet channels.

20. A catalyst assembly as recited in claim 18 wherein said inlet channels comprises a catalyst coating.

21. A catalyst assembly as recited in claim 18 wherein said inlet channels and said exit channels are alternatively position in said support structure.

* * * * *